(12) United States Patent
Van Assche et al.

(10) Patent No.: US 10,382,540 B2
(45) Date of Patent: Aug. 13, 2019

(54) SYNCHRONIZING STORAGE STATE INFORMATION

(71) Applicant: Fusion-io, Inc., Salt Lake City, UT (US)

(72) Inventors: Bart Van Assche, Salt Lake City, UT (US); Robert Wipfel, Draper, UT (US); Mike Christie, Salt Lake City, UT (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 1378 days.

(21) Appl. No.: 14/449,834

(22) Filed: Aug. 1, 2014

(65) Prior Publication Data

US 2015/0350318 A1    Dec. 3, 2015

Related U.S. Application Data

(60) Provisional application No. 62/004,779, filed on May 29, 2014.

(51) Int. Cl.
*H04L 29/08* (2006.01)
*G06F 3/06* (2006.01)

(52) U.S. Cl.
CPC ............ *H04L 67/1095* (2013.01); *G06F 3/06* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 2002/0029239 A1* | 3/2002 | Sullivan | G06F 9/52 718/104 |
| 2004/0133606 A1* | 7/2004 | Miloushev | G06F 17/30091 |
| 2012/0030408 A1 | 2/2012 | Flynn et al. | |
| 2013/0205114 A1 | 8/2013 | Badam et al. | |
| 2014/0122718 A1* | 5/2014 | Thoppai | G06F 17/30171 709/225 |

FOREIGN PATENT DOCUMENTS

WO    2012016089    2/2012

OTHER PUBLICATIONS

Mahesh Balakrishnan, Dahlia Malkhi, Vijayan Prabhakaran and Ted Wobber, "Going Beyond Paxos," Microsoft Technical Report, No. MSR-TR-2011-86, Jul. 29, 2011, 16 pages.

* cited by examiner

*Primary Examiner* — Amresh Singh
(74) *Attorney, Agent, or Firm* — Kunzler Bean & Adamson, PC

(57) ABSTRACT

Techniques are disclosed relating to synchronizing state information across nodes in a cluster. In one embodiment, a first cluster node receives a request to update state information for a logical volume of the cluster. The first cluster node acquires a lock from a distributed lock manager of the cluster, the lock controlling modification of the state information. In response to acquiring the lock, the first cluster node updates the state information across cluster nodes of the cluster. In one embodiment, first cluster node updates the state information in some, but not all, of the cluster nodes. In some embodiments, the first cluster node updates the state information across only cluster nodes associated with the logical volume.

20 Claims, 10 Drawing Sheets

SYNCHRONIZING STORAGE STATE INFORMATION

The present application claims the benefit of U.S. Provisional Appl. No. 62/004,779 filed on May 29, 2014, which is incorporated by reference herein in its entirety.

BACKGROUND

Technical Field

This disclosure relates generally to accessing data on storage devices, and more specifically to synchronizing state information across nodes in a storage system.

Description of the Related Art

Various storage protocols have been developed to facilitate accessing data on storage devices. These protocols may define physical connections between computers and storages devices, bus bandwidth speeds, command sets for accessing storage devices, addressing schemes, etc. Some protocols may also implement security features and checksum capabilities to detect errors in written and read data. Examples of various storage protocols may include small computer system interface (SCSI) protocols, SCSI remote direct memory access (RDMA) protocols, Fibre Channel, etc.

Some of the protocols, such as the ones just mentioned, may be employed to implement a storage system distributed across a network such as a network-attached storage (NAS) or a storage area network (SAN). These storage systems may include multiple servers, each with multiple storage devices. In order to coordinate servicing storage requests, servers may share configuration information for maintaining operation of the storage system.

SUMMARY

The present disclosure describes embodiments of a storage system that supports synchronization of state information.

In one embodiment, a method is disclosed that includes a first cluster node of a cluster receiving a request to update state information for a logical volume of the cluster. The method includes the first cluster node acquiring a lock from a lock manager of the cluster, where the lock controls modification of the state information. The method further includes the first cluster node updating, in response to acquiring the lock, the state information across cluster nodes of the cluster.

In another embodiment, an apparatus is disclosed that includes a lock management module and a storage interface module. The lock management module is configured to maintain locks for controlling access to configuration information usable by a plurality of servers to implement a storage system. The storage interface module is configured to receive, at a first of the plurality of servers, a request to access a set of storage devices of the storage system. The storage interface module is further configured to secure, for the first server, a first of the locks to modify the configuration information in response to the request, and to secure, for the first server, a second one or more of the locks to notify some, but not all, of the plurality of servers that the configuration information has been modified.

In yet another embodiment, a non-transitory computer readable medium is disclosed that has program instructions stored thereon. The program instructions are executable by a computing system to cause the computing system to perform operations. The operations include receiving a request to alter small computer system interface (SCSI) state information distributed across a plurality of storage servers, where the SCSI state information is usable by the plurality of storage servers to control access to a logical unit number (LUN). The operations include, in response to the request, converting a lock that restricts altering the SCSI state information by the plurality of servers. The operations further include altering the SCSI state information based on the request and propagating the altered SCSI state information to others of the plurality of servers.

Figure 1:
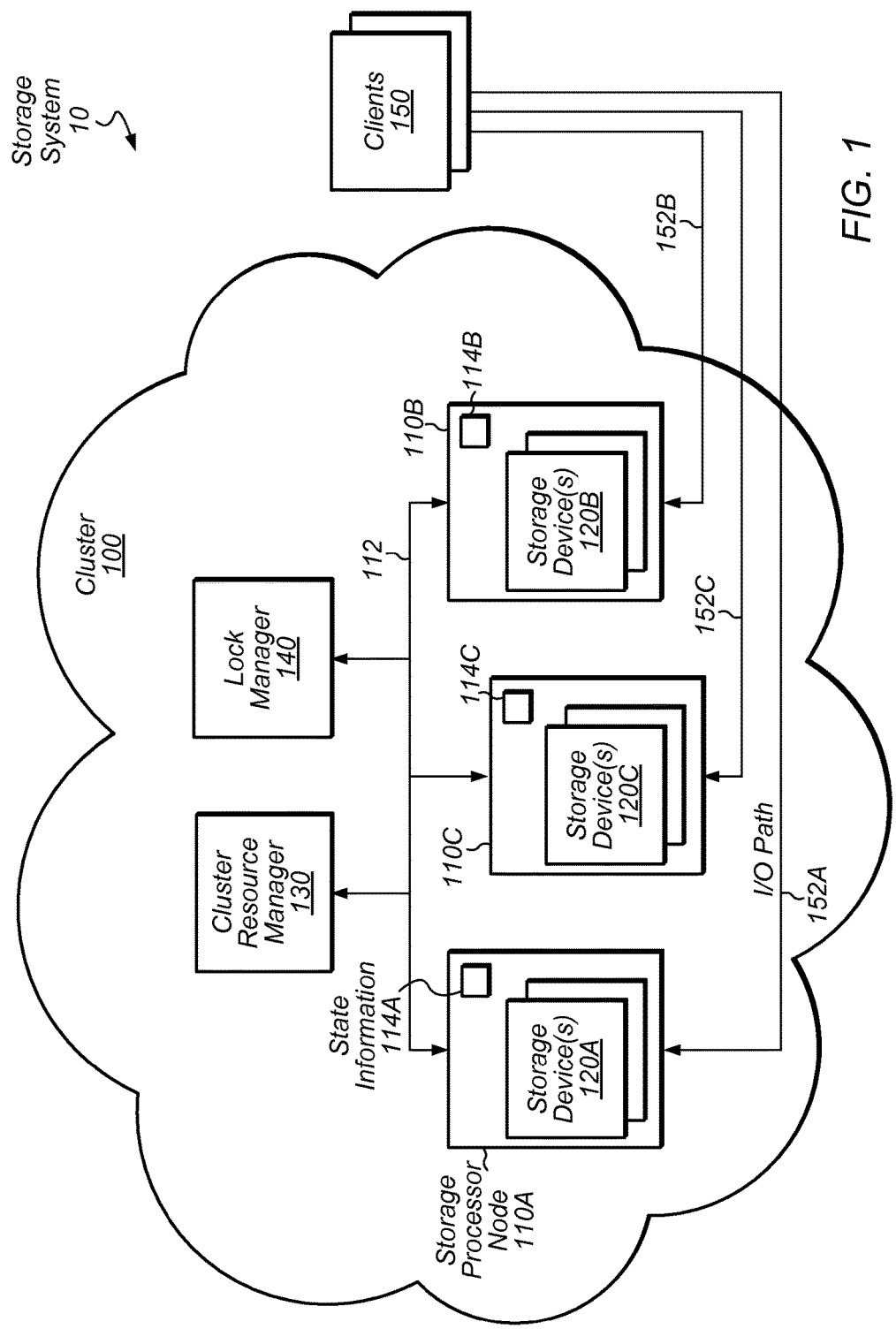
FIG. 1 is a block diagram illustrating one embodiment of a storage system implemented by a cluster.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

This disclosure also references accompanying drawings. In the drawings, similar symbols typically identify similar components, unless context dictates otherwise. The illustrative embodiments described in the detailed description, drawings, and claims are not meant to be limiting. Other embodiments may be utilized, and other changes may be made to these embodiments, without departing from the scope of the disclosure.

Various units, circuits, or other components in this disclosure may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Additionally, "configured to" can include generic structure (e.g., generic circuitry) that is manipulated by software and/or firmware (e.g., an FPGA or a general-purpose processor executing software) to operate in a manner that is capable of performing the task(s) at issue. Reciting that a unit/circuit/component is "configured to" perform one or more tasks is expressly intended not to invoke 35 U.S.C. § 112, sixth paragraph, for that unit/circuit/component.

Various determinations described herein may be described using the term "based on" when referring to one or more factors that affect a determination. This term is intended to be open-ended and does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

As used herein, the terms "first," "second," etc. are used as labels for nouns that they precede, and do not imply any type of ordering (e.g., spatial, temporal, logical, etc.). For example, in a cluster having multiple cluster nodes, the "first" and "second" cluster nodes can be used to refer to any two of the cluster nodes.

DETAILED DESCRIPTION

The present disclosure describes embodiments in which a storage system may be implemented by a cluster including multiple cluster nodes. The term "cluster" has its ordinary and accepted meaning in the art, and refers to a group of computing devices that are coupled together to perform one or more tasks. Individual ones of the computing devices may be referred to generally as "cluster nodes." The term "storage system" refers to a cluster that provides storage services. As will be described below, in various embodiments, cluster nodes may maintain state information usable to implement the storage system. As used herein, the term "state information" refers generally to information that is maintained across a set of cluster nodes and that is used by the cluster nodes to provide one or more services—e.g., implementing a storage system. In such an embodiment, the cluster may execute a lock manager that maintains locks, which can be acquired by individual cluster nodes to modify the state information or data. As used herein, the term "lock" has its ordinary and accepted meaning in the art, and refers to a mechanism for restricting access to a resource (e.g., state information or data) by resource consumers (e.g., cluster nodes, or clients).

In some embodiments, the storage system may be partitioned into multiple logical disks each associated with its own state information. In such an embodiment, a lock may be associated with a logical disk—thus, if a cluster node wants to update state information for that logical disk, the cluster node may acquire a lock for the logical disk and update corresponding state information for that logical disk. As will also be described below, in some embodiments, ones of the locks may also be used to convey state information among cluster nodes using lock value blocks and to send notifications among nodes when state information is updated or erroneous.

The disclosure initially describes, with reference to FIG. 1, a storage system implemented by a cluster configured to synchronize state information across multiple cluster nodes. Components within a cluster node are then described within reference to FIG. 2. Methods for initializing cluster nodes, updating stage information, and correcting erroneous state information are described with reference to FIGS. 3-5B. Other embodiments relating to synchronization of state information are described in further detail with reference to FIGS. 6 and 7. An exemplary computing system that may implement a portion of the storage system is finally described with reference to FIG. 8.

Turning now to FIG. 1, a block diagram of a storage system 10 is depicted. In the illustrated embodiment, storage system 10 is implemented by a cluster 100 and includes one or more clients 150. Cluster 100, in turn, includes multiple storage processor nodes 110A-C coupled together via an interconnect 112. Cluster 100 may further include a cluster resource manager 130 and a lock manager 140. In some embodiments, cluster 100 may include more (or less) storage processor nodes than shown.

Cluster 100, in one embodiment, is configured as a high availability cluster. The term "high availability" connotes that the cluster may undergo minimal downtime by providing fault tolerance through system redundancy. It also connotes a cluster's ability to fail over services from primary systems to secondary backup systems. For example, in the event of a failure, the cluster may fail over a cluster resource (e.g., a web server) on a first cluster node to a second cluster node by stopping execution on the first cluster node and starting execution on the second cluster node. In the illustrated embodiment, cluster 100 achieves high availability through using cluster resource manager 130. In various embodiments, cluster resource manager 130 manages operation of cluster 100 through monitoring the current state of cluster nodes (referred to generally as a node's "health") and determining whether to redistribute cluster resources as the state changes. In one embodiment, cluster resource manager 130 may monitor the health of storage processor nodes 110 by periodically communicating a signal (referred to as a heartbeat signal) between storage processor nodes 110. Although depicted as a single block for illustration purposes, in various embodiments, cluster resource manager 130 may execute as a distributed application. As used herein, the term "distributed application" is an application that executes across multiple cluster nodes. Accordingly, cluster resource manager 130 may execute across multiple storage processor nodes 110 and/or other cluster nodes independent of storage processor nodes 110. In some embodiments, cluster resource manager 130 may be implemented using existing high availability software such as Linux Pacemaker, VMware's vSphere®, etc. As will be described below, in various embodiments, cluster resource manager 130 may provide information usable by lock manager 140 in order to facilitate synchronization of state information across storage processor nodes 110. In some embodiments, this information may include identification information for cluster nodes that are included within cluster 100, indications of when cluster nodes join or leave cluster 100, etc.

Storage processor nodes 110, in one embodiment, are cluster nodes configured to implement a storage area network (SAN) that provides access to storage devices 120. In the illustrated embodiment, each storage processor node 110 is coupled to one or more clients 150 via a respective input/output (I/O) path 152. Storage devices 120 may be any suitable type of storage device such as those discussed below with respect to FIG. 8. Similarly, I/O paths 152 may be any suitable form of interconnect such as those discussed below with respect to FIG. 8. In some embodiments, storage processor nodes 110 (or a subset of storage devices 120 within a storage processor node 110) may be addressable as a logical unit (i.e., a collection of physical capacity on one or more physical storage devices perceived by a client 150 as one storage device—also referred to herein as a "logical disk" or a "logical volume"). The address of this logical disk may be referred to generally as a logical unit number (LUN). Accordingly, a client 150 may issue read and write requests to storage processor node 110A by addressing a logical unit number (LUN) assigned to one or more storage devices 120 within that storage processor node 110. In some embodiments, only a portion of each storage device 120 may be allocated for logical-disk use while other portions are used for some other purpose. For example, in one embodiment, each storage device 120 includes multiple partitions, where only one or more of those partitions are used to store data of the logical disk. In various embodiments, some or all of the data within a storage processor node 110 may be replicated across one or more other storage processor nodes 110. (In such an embodiment, clients 150 may also be replicas of one another in order to provide redundancy.) In some embodiments, data may be replicated in accordance with a redundant array of independent disks (RAID) scheme.

Clients 150, in one embodiment, are computing devices configured to access data on storage devices 120 through cluster nodes 110. In some embodiments, clients 150 may, in turn, use data from cluster nodes 110 to provide services to additional clients (not shown). For example, in one embodiment, clients 150 may implement web servers that store webpage data on cluster nodes 110. In various embodiments, clients 150 may implement a reservation scheme when accessing data at storage processor nodes 110 in order to prevent potential collisions (e.g., one client 150 reading a data block while another is writing to it). In one embodiment, if a client 150 wants to access data on a storage processor node 110, the client 150 submits a reservation request for exclusive access to that data. For example, the client 150 may request access for a particular logical disk. Upon being granted access, the client 150 may then read and write data accordingly. The client 150 may also periodically renew its reservation while continuing to access the logical disk. In some embodiments, these reservation requests may be submitted in accordance of SCSI's persistent reservation scheme (e.g., as defined in SCSI-3).

In the illustrated embodiment, storage processor nodes 110 maintain state information 114A-C that is synchronized across nodes 110 in order to implement storage system 10. State information 114 may include any of a variety of information. In one embodiment, information 114 may include access state information that indicates whether particular storage processor nodes 110 are active, idle, on standby, or disabled, and that indicate whether particular storage processor nodes 110 are assigned primary, secondary, or tertiary roles that dictate responsibility for servicing requests for a particular logical disk. In one embodiment, state information 114 may include identification information specifying what cluster nodes 110 implement a logical disk and a mapping indicating where particular data is stored on storage devices 120. In one embodiment, state information 114 includes reservation information for clients 150. Such information may identify whether or not particular logical disks have been persistently reserved by clients 150, the storage processor nodes 110 holding reservations for clients 150, key information (e.g., a reservation key specified in a reservation request, a transport ID of a client 150, an ID of the target port over which the reservation request was received, and/or the number of persistent reservation keys that have been registered), the persistent reservation generation number, etc. This reservation information may also include information about the reservations held such as the persistent reservation type, the persistent reservation scope, and/or an indication of whether or not Activate Persistence Through Power Loss (APTPL) has been enabled by a client 150. Accordingly, in some embodiments, this reservation information may include SCSI persistent reservation data, for example, as specified in SCSI Primary Commands (SPC)-4. In some embodiments, state information 114 may be maintained on a per-logical-disk basis. As will be described below, in various embodiments, storage processor nodes 110 may synchronize information across storage process nodes 110 using lock manager 140.

Lock Manager 140, in one embodiment, maintains locks for various resources of cluster 100 including locks for state information 114. Accordingly, lock manager 140 may store lock information such as lock names, lock states (e.g., no lock (NL), concurrent read (CR), concurrent write (CW), protected read (PR), protected write (PR), and exclusive (EX)), and indications of lock holders. Lock manager 140 may service requests to acquire locks, preempt locks (i.e., acquire a lock that is already held by some other entity), and release locks. As used herein, the term "converting" refers generally to an action that changes the state of a lock such as acquisition, preemption, and release. In some embodiments, lock manager 140 may associate locks with a respective master (e.g., a storage processor node 110) that handles granting of lock conversions (as opposed to those conversions being granted by lock manger 140). In some embodiments, lock manager 140 may also store lock value blocks for one or more locks. As used herein, the term "lock value block" refers to a block of data that is provided to a consumer (e.g., a storage processor node 110) upon acquiring a lock. In various embodiments, the data within a lock value block may be modifiable and is returned to the lock master (or lock manager 140) upon release of a lock. In one embodiment, lock manager 140 may associate callback routines with locks that are invoked at a lock holder when another consumer attempts to acquire a lock. For example, if storage processor node 110A holds a lock and storage processor node 110B attempts to acquire the lock, storage processor node 110A may receive a notification of 110B's attempt and perform the corresponding callback routine as specified by lock manager 140. In some embodiments, such a callback routine may be referred to as a blocking asynchronous system trap (BAST). Although shown as a single block in FIG. 1, in various embodiments, lock manager 140 executes as a distributed application across multiple storage processor nodes 110—thus, lock manager 140 may be referred to as a "distributed lock manager." Accordingly, in such an embodiment, lock manager 140 may execute to ensure that lock information is consistent across cluster nodes, so that multiple storage processor nodes 110 do not simultaneously acquire a lock. In one embodiment, lock manager 140 may add or remove locks as cluster nodes join or leave cluster 100 as indicated by cluster resource manager 130.

As will be described below with respect to FIG. 2, in various embodiments, storage processor nodes 110 may use locks provided by lock manager 140 to synchronize state information 114 across nodes 110. In various embodiments discussed below, locks may be used to control access to state information 114 such that only one node 110 is able to alter state information 114 at a given time. In various embodiments, locks may also be used to convey state information 114 among storage processor nodes 110 by storing information 114 in lock value blocks, and to send notifications among storage processor nodes 110 by invoking callback routines.

Figure 2:
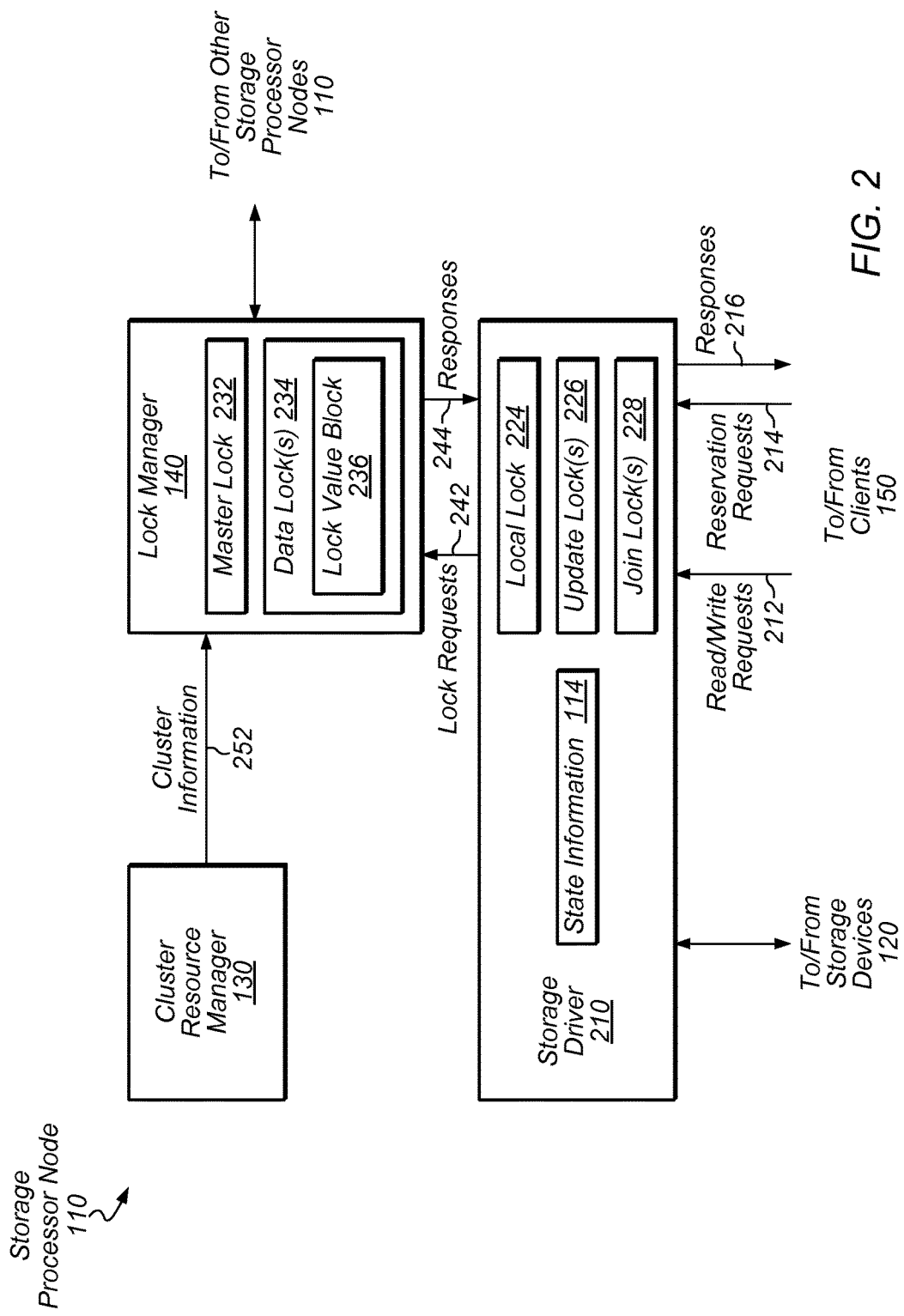
FIG. 2 is a block diagram illustrating one embodiment of a storage processor node within the cluster.

Turning now to FIG. 2, a block diagram of a storage processor node 110 is depicted. In the illustrated embodiment, storage processor node 110 includes an instance (i.e., copy) of cluster resource manager 130, an instance of lock manager 140, and an instance of storage driver 210.

Storage driver 210, in one embodiment, manages operation of storage devices 120 and interfacing with clients 150. Accordingly, storage driver 210 may receive read and write requests 212 from a client 150 and issue corresponding commands to storage devices 120 to service those requests. In various embodiments, storage driver 210 may also receive requests 214 from clients 150 to reserve access to storage devices 120 (more specifically, in some embodiments, a reservation request 214 may request access to a logical disk implemented by the cluster node 110, as discussed above). Storage driver 210 may then issue corresponding responses 216 indicating whether those requests are granted or denied. In some embodiments, requests 212 and 214 are sent over the same channel of I/O paths 152; in other embodiments, requests 212 and 215 may be sent over separate channels. In some embodiments, storage driver 210 may implement a SCSI target, and clients 150 may implement SCSI initiators. In such an embodiment, reservation requests 214 may comply with SCSI persistent reservation requests. In other embodiments, storage driver 210 may implement other standard protocols.

In the illustrated embodiment, storage driver 210 maintains a local copy of state information 114, which it uses to facilitate access to storage devices 120. Storage driver 210 may modify this copy in response to any of various events. Accordingly, in various embodiments, state information 114 may be updated in response to receiving a request to do so (either explicitly or implicitly). For example, in one embodiment, storage driver 210 may update state information 114 in response to receiving a reservation request 214. More specifically, given a reservation request 214 may specify various forms state information (such as those discussed above with respect to FIG. 1). In response to determining that a request 214 should be granted, storage driver 210 may store that information in its local copy of state information 114 in order for state information 114 to reflect the reservation being held by a requesting client 150. In order to enforce this reservation, this state information may be propagated to other storage processor nodes 110. As another example, state information 114 may also be updated in response to a storage processor node 110 joining or leaving cluster 100. In various embodiments, when the local copy of state information 114 is modified, storage driver 210 notifies storage drivers 210 in other storage processor nodes 110 and conveys the changes to them as discussed below.

As noted above, in some embodiments, state information 114 may be maintained a per-logical-disk basis. In such an embodiment, each storage driver 210 may store state information 114 for only the logical disk (or disks) being implemented (i.e., served) by that storage processor node 110. Accordingly, if state information 114 for a given logical disk is updated, those changes may be propagated to only those nodes 110 that implement the logical disk (as opposed to propagating changes to all storage processor nodes 110 in cluster 100). As a result, cluster 100 can scale more easily as the total number of nodes 110 may be substantially larger than the number of copies of state information for a given logical disk. In other words, as the number of storage processor nodes 110 increases the amount of state information 114 maintained by a given node 110 does not increase proportionally, making scaling more viable. Also, the time for synchronizing an update is proportional to the number of data copies of state information 114 for a given logical disk, instead of the number of storage processor nodes 110.

Lock manager 140, in one embodiment, controls access to state information 114 via locks 224-234. As with state information 114, in some embodiments, each set of locks 224-234 may be associated with a given logical disk. In such an embodiment, only a single instance of master lock 232 and data locks 234 may be maintained; however, each storage driver 210 (and thus each storage processor node 110) may be assigned a respective set of locks 224-228. In other words, if storage processor node 110A and storage processor node 110B serve the same logical disk, each of nodes 110A and 110B include a set of locks 224-228 associated that logical disk. In various embodiments, however, locks 224-234 are distributed locks—i.e., each storage processor 110 serving a logical disk is aware of the states of all locks 224-234. For example, storage processor node 110A is aware of the state of the update lock 226 on storage processor node 110B. In the illustrated embodiment, storage driver 210 may covert locks 224-234 by submitting a lock request 242 identifying the lock and the desired state. Lock manager 140 may then submit a response 244 indicative of whether the lock request 242 can be granted. In some embodiments, more (or less) locks may be used than depicted in FIG. 2.

In the illustrated embodiment, lock manager 140 manages locks 224-234 based on cluster information 252 received from cluster resource manager 130. Accordingly, in some embodiments, cluster information 252 may specify a membership list of unique identifiers for each of the storage processor nodes 110 in cluster 100. Based on this list, lock manager 140 may determine how many locks 224-228 to maintain and assign locks 224-228 to nodes 110 based on their unique identifiers. In some embodiments, cluster information 252 may also specify when storage processor nodes 110 join or leave cluster 100, and lock manager 140 may add or remove locks 224-228 as warranted.

Master lock 232, in one embodiment, is acquired any time a storage driver 210 wants to modify state information 114 in order to ensure that only one storage processor node 110 modifies state information 114 across nodes 110 at a given time. In such an embodiment, the storage driver 210 may continue to hold master lock 232 until the modification is complete and the changes have been propagated to the storage drivers 210 in other storage processor nodes 110. Thus, in one embodiment, multiple storage drivers 210 may receive reservation requests 214 in parallel, however, due to master lock 232, storage drivers 210 may still service these requests 214 serially (i.e., one after the other). (As used herein, the term "parallel" refers to two or more actions that are performed such that they overlap for at least some portion in time.) Accordingly, in one embodiment, upon releasing master lock 232 after an update, storage driver 210 may send a response indicating that the change was performed successfully and that other nodes 110 may now acquire master 232 to service requests to update state information 114 across nodes 110.

Local lock 224, in one embodiment, is acquired any time a storage driver 210 wants to modify its local copy of state information 114. In some embodiments in which storage driver 210 is implemented by multiple executing processes, local lock 224 may be used to ensure that a process does not attempt to read state information 114 while another process is updating it.

Data locks 234, in one embodiment, are used by storage driver 210 to convey state information 114 via lock value blocks 236 to other storage processor nodes 110. As will be described below with reference to FIGS. 3-5, in some embodiments, when storage driver 210 wants to update state information across storage processor nodes 110, storage driver 210 may send a lock request 242 to acquire data locks 234. Upon acquiring the locks 234, the storage driver 210 may receive the corresponding lock value blocks 236 in which storage driver 210 places its local copy of state information 114. Once it releases the data locks 234, storage drivers 210 in other storage processor nodes 110 can acquire data locks 234 to obtain the lock value blocks 236, and thus, the updated state information 114 in those blocks 236. In some embodiments, more than one data lock 234 may be employed depending on the size of state information 114 and the size of a lock value block 236.

Update locks 216, in one embodiment, are used to convey notifications to other storage processor nodes 110 when state information 114 is updated. As will be described below with respect to FIGS. 4A and 4B, in some embodiments, if a storage driver 210 in one storage processor node 110 wants to covey an update to another storage processor node 110, the storage driver 210 may acquire the update lock 216 of that node 110 to notify it of the update. Upon receiving an indication that its lock 216 has been acquired, the storage driver 210 in the other storage processor node 110 may then retrieve the updated state information via lock value blocks 236. In various embodiments, this retrieval may be performed as part of a callback routine (e.g., a BAST, in one embodiment, as discussed above) invoked at the other node 110 when its update lock 216 is acquired. In some embodiments, a given storage processor node 110 may be associated with multiple update locks 216 to invoke separate callback routines. For example, in one embodiment, a pair of update locks 216 may be used where a first of the locks 216 is obtained to initially indicate that an update is about to occur, and a second of the locks 216 is obtained to indicate when the update has completed. (In some embodiments described below, these locks may be referred to as update locks U and U'.) In various embodiments, storage driver 210 serving a logical disk may acquire locks 216 for each node 110 that also serves the logical disk in order to propagate an update to the group. As will be described below with respect to FIG. 3, in some embodiments, storage driver 210 may perform an initialization method where locks 224-234 are set to an initial state and callback routines for ones of the locks are defined.

Join locks 218, in one embodiment, are used to indicate when lock value blocks 236 include invalid data (e.g., erroneous or incomplete data) and to cause correction of the erroneous data. Such a determination may occur, for example, when a storage processor node 110 joins cluster 100 after a split brain event (i.e., an event in which one or more storage processor nodes 110 leave cluster 100 due to a network failure of interconnect 112). Upon joining the storage processor 110 may attempt to download the newest instance of state information 114 and determine that it is invalid because it is inconsistent with its own copy of state information 114. In one embodiment, upon identifying this invalid data, the storage processor node 110 may initially determine whether it can correct the inconsistency by replacing it with data from its local state information 114. If the storage processor node 110 can, it may correct the error and use update locks 216 to propagate the change. If it cannot correct the error, the storage processor node 110 may acquire join locks 218 of other nodes 110 to notify them of the error and to cause them to correct it. As with data locks 216, in one embodiment, acquiring a join lock 218 of a storage processor node 110 may cause a callback routine to be invoked on that node 110. As will be described below with respect to FIGS. 5A and 5B, performance of the callback routine may include acquiring data locks 234 and replacing data in lock value blocks 236 with data from the local copy of state information 114. In some embodiments, multiple join locks 218 may be used to invoke separate callback routines. For example, in one embodiment, a first of a pair of join locks 218 may be acquired to indicate that invalid data has been identified; a second of the lock pair may be acquired to request that the invalid data be replaced. In some embodiments described below, these locks 228 may be referred to as J and J'.

Figure 3:
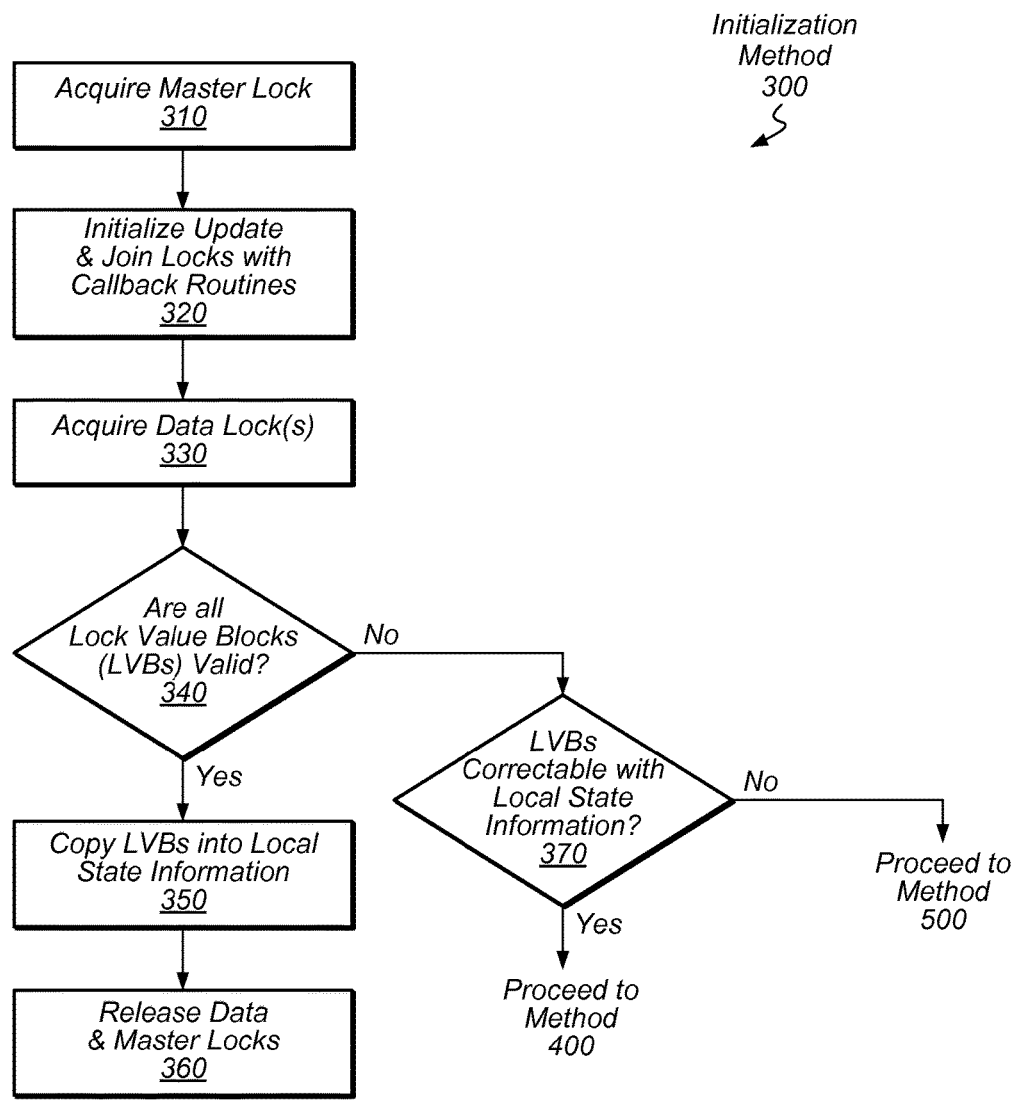
FIG. 3 is a flow diagram illustrating one embodiment of a method that may be performed to initialize a cluster node within the cluster.

Turning now to FIG. 3, a flow diagram of an initialization method 300 is depicted. Method 300 is one embodiment of a method for preparing a storage processor node 110 to synchronize state information 114 among nodes 110. In various embodiments, method 300 may be performed by a storage processor node 110 upon initially joining cluster 100 or upon re-joining cluster 100 (e.g., after a failure of interconnect 112).

In step 310, a storage processor node 110 acquires master lock 232 in order to ensure that other nodes 110 do not update state information 114 while it is performing method 300.

In step 320, the storage processor node 110 sets its one or more update locks 226 and one or more join locks 228 to an initial state; callback routines are also defined for the locks 226 and 228. In an embodiment in which lock pairs are used, lock J and U may be set to an exclusive mode (EX) such that no other node 110 can acquire lock 226; J' and U' may be set to a no-lock mode (NL) in which J' and U' are released and available for acquisition.

In step 330, the storage processor node 110 acquires one or more data locks 234 to obtain their lock value blocks 236. In one embodiment, the storage processor node 110 may set the state of the data locks 234 to a protected write mode (PW) in which the storage processor node 110 is the only node 110 permitted to write to blocks 236.

In step 340, the retrieved lock value blocks 236 are assessed for validity. If data within blocks 236 is invalid, method 300 proceeds to step 370. Otherwise, method proceeds to step 350.

In step 350, data within the lock value blocks 236 is copied into the local copy of state information 114. In one embodiment, performance of step 350 may include acquiring local lock 224 before the copying and releasing it afterwards.

In step 360, data locks 234 and master lock 232 are released allowing other storage processor nodes 110 to modify state information 114. In one embodiment, step 360 may include setting the state of data locks 234 to a concurrent read mode (CR) in which other nodes 110 are permitted to read lock value blocks 236 in parallel, and setting the state of master lock 232 from EX back to NL.

In step 370, the storage processor node 110 determines whether the data in the lock value blocks 236 can be corrected with local state information 114. If it can be corrected, the storage processor node 110 proceeds to correct the data with performance of method 400 discussed below with respect to FIG. 4A. If it cannot, the storage processor 110 notifies the other nodes 110 with performance of method 500 discussed with respect to FIG. 5A.

Figure 4A:
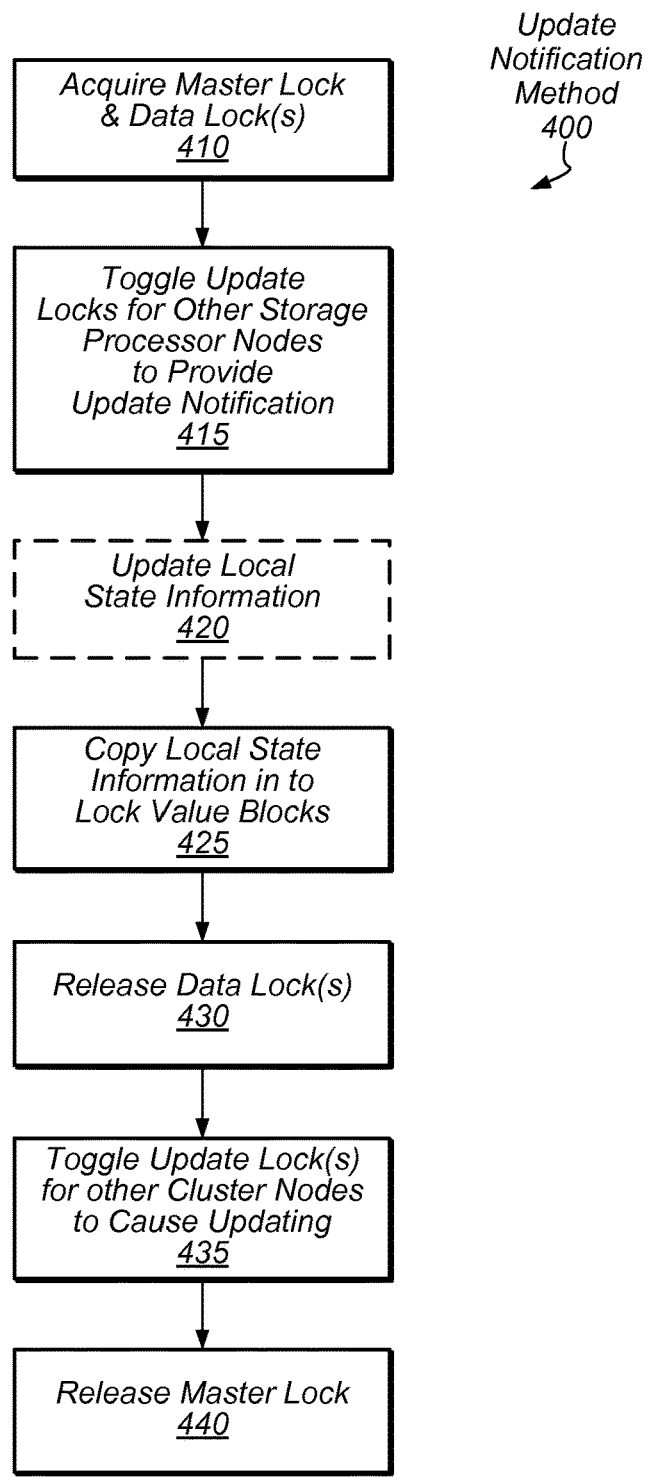
FIG. 4A is a flow diagram illustrating one embodiment of a method that may be performed by a cluster node to inform other clusters about an update to state information of the storage system.

Turning now to FIG. 4A, a flow diagram of an update notification method 400 is depicted. Method 400 is one embodiment of a method for notifying other storage processor nodes 110 when state information 114 has been altered. In some embodiments, method 400 may be performed in response to a storage processor node 110 receiving a request to update state information such as receiving a reservation request 214. Method 400 may also be performed when invalid data within lock value blocks 236 is be corrected.

In step 410, a storage processor node 110 acquires master lock 232 and data locks 234 (if they were not previously acquired during performance of method 300). In one embodiment, step 410 may include setting master lock 232 to EX and data locks 234 to PW.

In step 415, update locks 226 for other storage processor nodes 110 are toggled (i.e., acquired and released) to provide update notifications to those nodes 110 that state information 114 for cluster 100 is about to be updated. As noted above, in some embodiments, these other storage processor nodes 110 may include only those that serve the same logical disk as the storage processor node 110 performing method 400. In one embodiment in which a pair of update locks 226 is used, step 415 may include setting locks U' and U from NL to EX and back to NL. This toggling may then result in a callback routine for lock U being invoked on the other nodes in response to U already being set to EX during performance of method 300.

In step 420, the storage processor node 110 updates its local state information 114. (If method 400 is being performed to correct invalid data in lock value blocks 236, step 420 may not be performed as indicated by the dotted line). In various embodiments, step 420 may further include acquiring and releasing local lock 224 while updating state information 114.

In step 425, local state information 114 is copied into lock value blocks 236. In some embodiments, step 425 may include copying in only the relevant updated portion of state information 114 (as opposed to updating all data in lock value blocks 236).

In step 430, data locks 234 are released making them available for access by other storage processor nodes 110. In one embodiment, the state of data locks 234 is set to CR.

In step 435, update locks 226 are again toggled in other storage processor nodes 110 to indicate that updating of state information 114 has completed. (Like step 415, update locks 226 may be toggled for only storage processor nodes 110 serving the same local disk.) In one embodiment in which a pair of update locks 226 are used, lock U' may be toggled from NL to EX and back to NL for each node 110. As will be described below with respect to FIG. 4B, this toggling may invoke a callback routine corresponding to method 450 in which the storage processor nodes 110 retrieve the updated state information 114.

In step 440, master lock 232 is released allowing other storage processor nodes 110 to update state information 114. In one embodiment, the state of master lock 232 is set to NL.

Figure 4B:
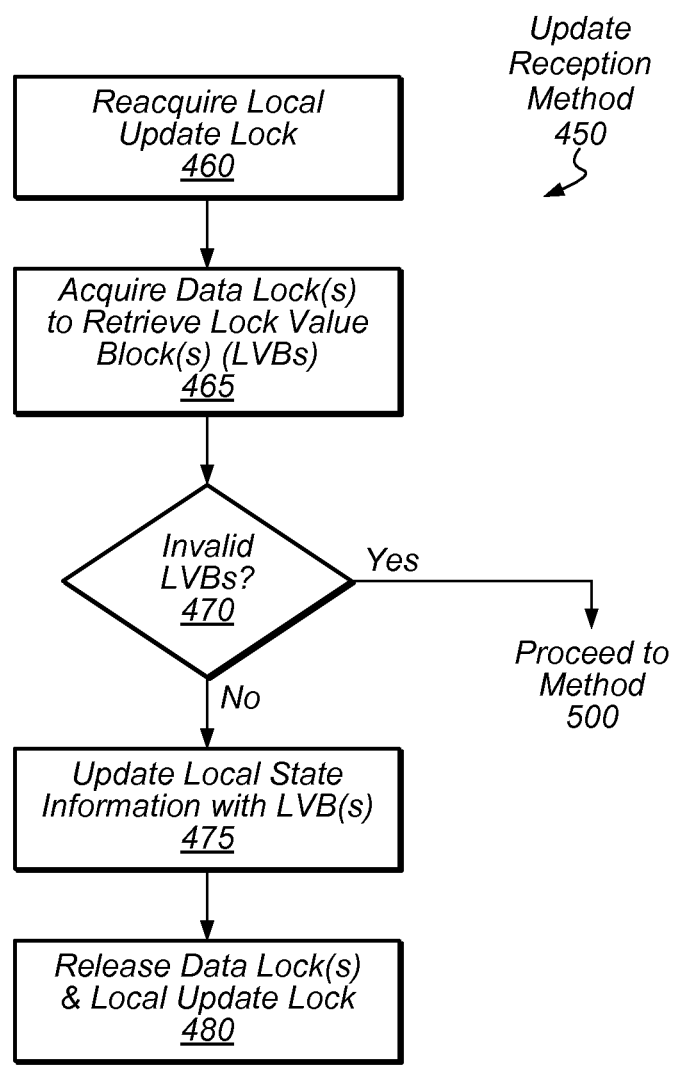
FIG. 4B is a flow diagram illustrating one embodiment of a method that may be performed by a cluster node to retrieve updated state information.

Turning now to FIG. 4B, a flow diagram of an update reception method 450 is depicted. Method 450 is one embodiment of method for retrieving state information 114 that has been updated by another storage processor node 110. In various embodiments, method 450 is performed as a callback routine at a storage processor node 110 in response to its update lock 226 being acquired by another node 110.

In step 460, a storage processor node 110 reacquires its update lock 226 from the storage processor node 110 sending the update notification in order to prevent reception of update notifications from other processor nodes 110 in the interim. In one embodiment, lock U is converted from NL back to EX.

In step 465, one or more data locks 234 are acquired to retrieve their lock value blocks 236. In one embodiment, data locks are converted from CR to PW.

In step 470, the data in the retrieved lock value blocks 236 are assessed to determine validity. If the data is invalid, method 450 proceeds to method 500 in which other storage processor nodes 110 are notified of the invalid data. If the data is determined to be valid, method 450 proceeds to step 475.

In step 475, the storage processor node 110 updates its local instance of state information 114 with the data in the retrieved lock value blocks 236. In various embodiments, step 475 may include acquiring and releasing local lock 224.

In step 480, data locks 234 and the local update lock 226 reacquired in step 460 are released allowing other storages processor nodes 110 to retrieve lock value blocks 236 and send subsequent update notifications to the storage processor node 110. In one embodiment, data locks 234 are set from PW to CR; the local update lock U is set from EX to NL.

Figure 5A:
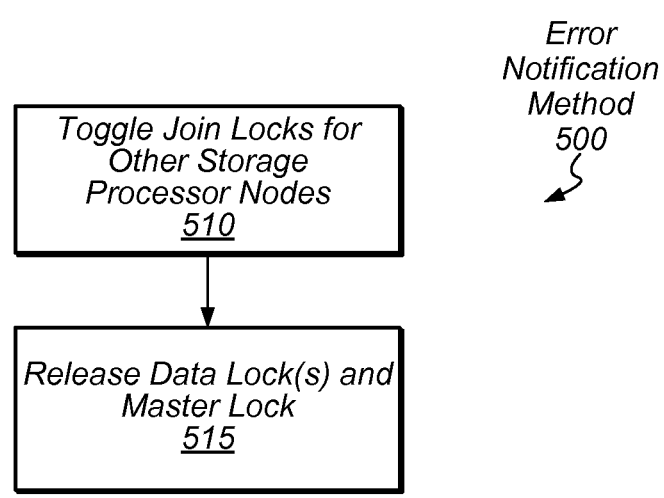
FIG. 5A is a flow diagram illustrating one embodiment of a method that may be performed by a cluster node to inform other clusters about an error with the state information.

Turning now to FIG. 5A, a flow diagram of an error notification method 500 is depicted. Method 500 is one embodiment of a method for notifying other storage processor nodes 110 when invalid data has been identified and for requesting that it be corrected. In some embodiments, method 500 may be performed after storage processor node 110 joins cluster 100 and identifies invalid data in lock value blocks 236.

In step 510, a storage processor node 110 toggles join locks 228 in order to request the invalid data within lock value block 236 be replaced with corrected data from state information 114 in those nodes 110. As with step 415 and 435, in some embodiments, step 510 may include toggling the join locks 228 for only the storage processor nodes 110 that serve the same logical disk as the node 110 performing method 500. In various embodiments, toggling join locks 228 may invoke a callback routine on the other storage processor nodes 110 corresponding to method 550 discussed below with respect to FIG. 5B in which nodes 110 attempt to correct the invalid data.

In step 515, data locks 234 are released; master lock 232 also released if it was previously held by the storage processor node 110 from performance of method 300 or method 400. In one embodiment, data locks 234 are set to CR, and master lock 232 is set to NL.

Figure 5B:
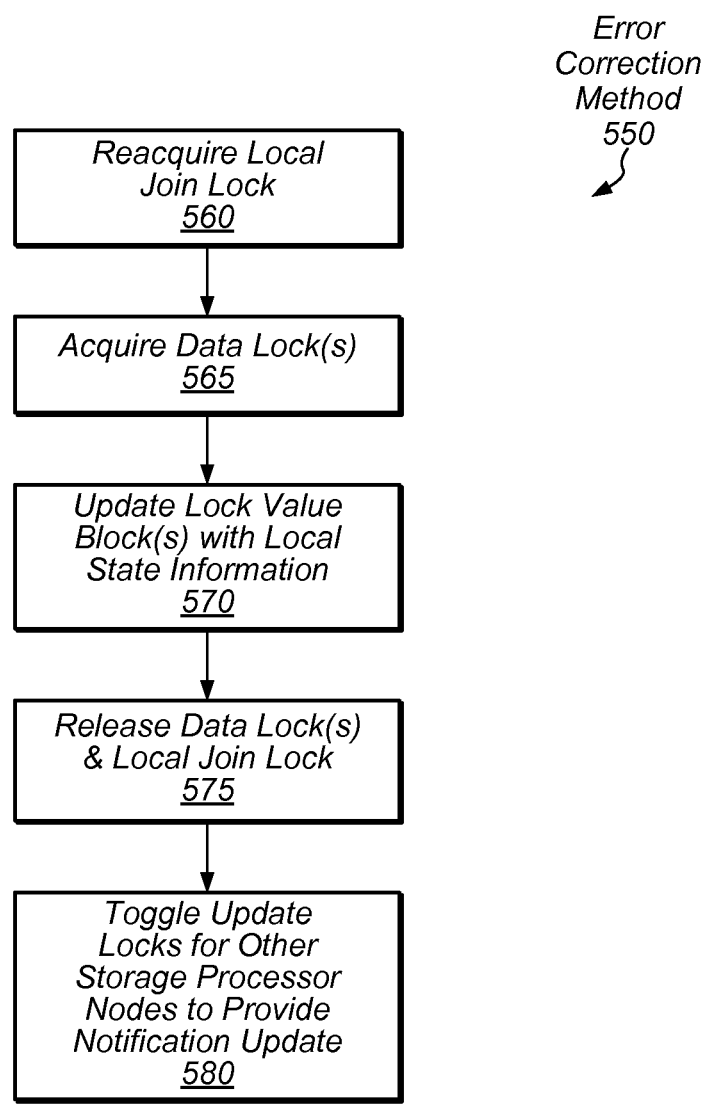
FIG. 5B is a flow diagram illustrating one embodiment of a method that may be performed by a cluster node to correct erroneous state information.

Turning now to FIG. 5B, a flow diagram of an error correction method 550 is depicted. Method 550 is one embodiment of method for correcting invalid data in lock value blocks. As noted above, in some embodiments, method 550 may be invoked as a callback routine in response to performance of step 510 in method 500.

In step 560, a storage processor node 110 reacquires its join lock 228 from the storage processor node 110 in order to prevent reception of error notifications from other processor nodes 110 in the interim. In one embodiment, lock J is converted from NL back to EX.

In step 565, one or more data locks 234 are acquired to retrieve their lock value blocks 236. In one embodiment, data locks are converted from CR to PW in order to retrieve blocks 236

In step 570, the lock value blocks 236 are updated with data from the local state information 114—assuming the storage processor node 110 is able to correct the erroneous data. In some embodiments, step 570 includes acquiring and releasing local lock 224 to prevent modification of the local state information 114 while the updating is occurring.

In step 575, data locks 234 and the local join lock 228 reacquired in step 560 are released allowing other storages processor nodes 110 to retrieve lock value blocks 236 and send subsequent error notifications to the storage processor node 110. In one embodiment, data locks 234 are set from PW to CR; the local update lock J' is set from NL to EX.

In step 580, the update locks in other storage processor nodes 110 are toggled (e.g., as in steps 415 and 435 discussed above) to indicate that the state information 114 been updated and to cause retrieval of the update.

Figure 6:
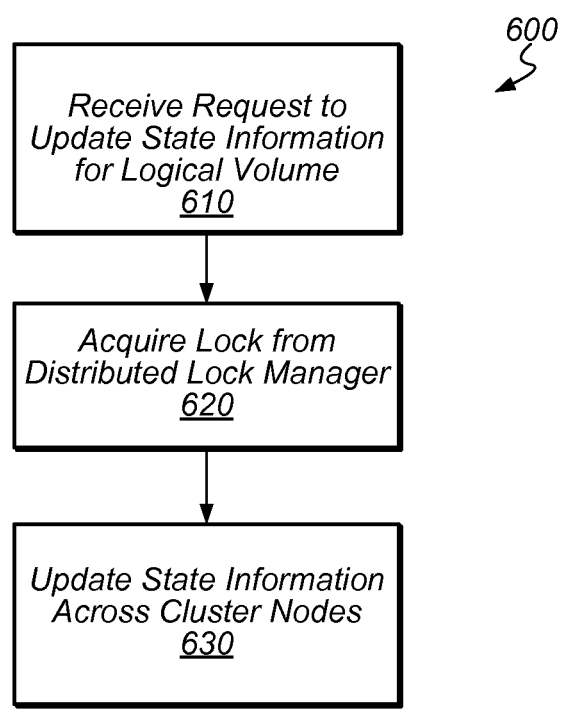
FIG. 6 is a flow diagram illustrating one embodiment of a method performed by a cluster node.

Turning now to FIG. 6, a flow diagram of a method 600 is depicted. Method 600 is one embodiment of a method that may be performed by a computing system such as cluster 100 or storage process node 110. In various embodiments, performance of method 600 may allow state information to be more efficiently synchronized across cluster nodes and permit cluster 100 to be more easily scaled.

In step 610, a cluster node (e.g., storage processor node 110A) of a cluster (e.g., cluster 100) receives a request to update state information (e.g., state information 114) for a logical volume (e.g., implemented by storage devices 130). In one embodiment, the request is a request (e.g., reservation request 214) from a client device to reserve exclusive access to the logical volume. In some embodiments, while the cluster node is receiving the request to update the state information, another cluster node (e.g., storage processor node 110B) of the cluster begins receiving a request (e.g., another reservation request 214) to update the state information, and both cluster nodes services the requests serially.

In step 620, the cluster node acquires a lock (e.g., master lock 232) from a lock manager (e.g., lock manager 140) of the cluster, the lock controlling modification of the state information.

In step 630, in response to acquiring the lock, the cluster node updates the state information across cluster nodes (e.g., storage processor nodes 110B and 110C) of the cluster. In one embodiment, step 630 includes the cluster node modifying the state information (e.g., its local copy of state information 114), and the cluster node acquiring, from the lock manager, a lock for a second cluster node (e.g., an update lock 226 for storage processor node 110B) to cause the second cluster node to retrieve the modified state information. In some embodiments, step 630 includes the cluster node acquiring a data lock (e.g., data lock 234) associated with a lock value block (e.g., lock value block 236), and the cluster node placing the modified state information into the lock value block, where the second cluster node retrieves the modified state information from the lock value block. In some embodiments, acquiring the lock for the second cluster node causes a callback routine (e.g., a blocking asynchronous system trap (BAST), in one embodiment) to be invoked at the second cluster node, where performance of the callback routine includes the second cluster node retrieving the modified state information. In various embodiments, step 630 includes the cluster node updating the state information in some, but not all, of the cluster nodes. In one embodiment, the cluster node updates the state information across only cluster nodes associated with the logical volume. In some embodiments, step 630 includes updating the state information to include an indication of the reserved exclusive access (e.g., SCSI PR information, as discussed above, in one embodiment).

Figure 7:
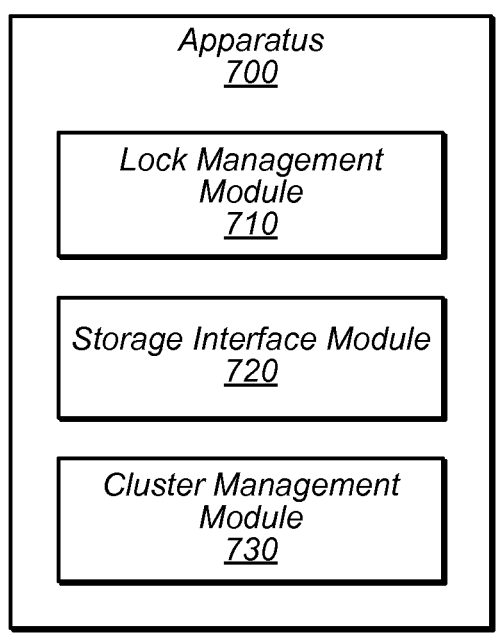
FIG. 7 is a block diagram illustrating one embodiment of an apparatus having a storage interface module and a lock management module.

Turning now to FIG. 7, a block diagram of an apparatus 700 that includes modules is depicted. As used herein, the term "module" refers to circuitry configured to perform operations or a memory having program instructions stored therein that are executable by one or more processors to cause performance of operations. Accordingly, a module may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations. Apparatus 700 may include modules to implement any of the functionality described herein. For example, in the illustrated embodiment, apparatus 700 includes a lock management module 710, a storage interface module 720, and a cluster management module 730.

Lock management module 710, in one embodiment, is configured to maintain locks (e.g., locks 224-234) for controlling access to configuration information (e.g., state information 114) usable by a plurality of servers (e.g., storage processor nodes 110) to implement a storage system (e.g., storage system 10). As used herein, the term "configuration information" refers to information that controls a behavior of a computing device. In various embodiments, lock management module 710 is configured to associate the maintained locks with a logical disk such that the maintained locks control access to configuration information for the logical disk. In some embodiments, lock management module 710 may implement functionality described above with respect to lock manager 140.

Storage interface module 720, in one embodiment, is configured to receive, at a first of the plurality of servers (e.g., storage processor node 110A), a request (e.g., a reservation request 214) to access a set of storage devices (e.g., storage devices 120) of the storage system. In such an embodiment, storage interface module 720 is further configured to secure, for the first server, a first of the locks (e.g., master lock 232) to modify the configuration information in response to the request, and to secure, for the first server, a second of one or more the locks (e.g., one or more of update locks 226) to notify some, but not all, of the plurality of servers (e.g., storage processor node 110B, but not storage processor node 110C) that the configuration information has been modified. In some embodiments, storage interface module 720 is configured to secure, for the first server, a respective lock assigned to each of the plurality of servers associated with the logical disk to notify each server that the configuration information has been modified. In some embodiments, storage interface module 720 is configured to secure the second one or more locks to invoke a callback routine on a second server that retrieves the modified configuration information for the second server. In one embodiment, storage interface module 720 is configured to detect, at the first server, invalid information in the configuration information, and to secure, for the first server, a third lock of a third of the plurality of servers (e.g., a join lock 228) to request that the third server replace the invalid information with correct information. In one embodiment, lock management module 710 is configured to assign a pair of locks to a second of the plurality of servers (e.g., a pair of update locks 226 to storage processor node 110B). In such an embodiment, storage interface module is configured to secure one of the pair of locks (e.g., update lock U discussed above) to notify the second server that the configuration information is being modified, and secure another of the pair of locks (e.g., update lock U') to notify the second server that modification of the configuration information has been completed. In some embodiments, lock management module 710 is configured to maintain a lock value block (e.g., lock value block 236) from one or more of the locks (e.g., data locks 234), and provide the lock value block to the first server in response to the one or more locks being secured for the first server. In such an embodiment, storage interface module 720 is configured to store the modified configuration information in the lock value block to convey the configuration information to a second of the plurality of servers. In some embodiments, storage interface module 720 may implement functionality described above with respect to storage driver 210.

Cluster management module 730, in one embodiment, to implement a cluster resource manager (e.g., cluster resource manager 130) for a storage system. In such an embodiment, the cluster resource manager identifies, to lock management module 710, (e.g., via cluster information 252) ones of the plurality of servers as cluster nodes of the storage system. In some embodiments, lock management module 720 is configured to assign locks to the identified servers. In one embodiment, storage interface module 720 is configured to detect the invalid information when the first server joins the storage system, and cluster management module 730 is configured to implement a cluster resource manager that notifies lock management module 710 that the first cluster node has joined the cluster storage system.

Figure 8:
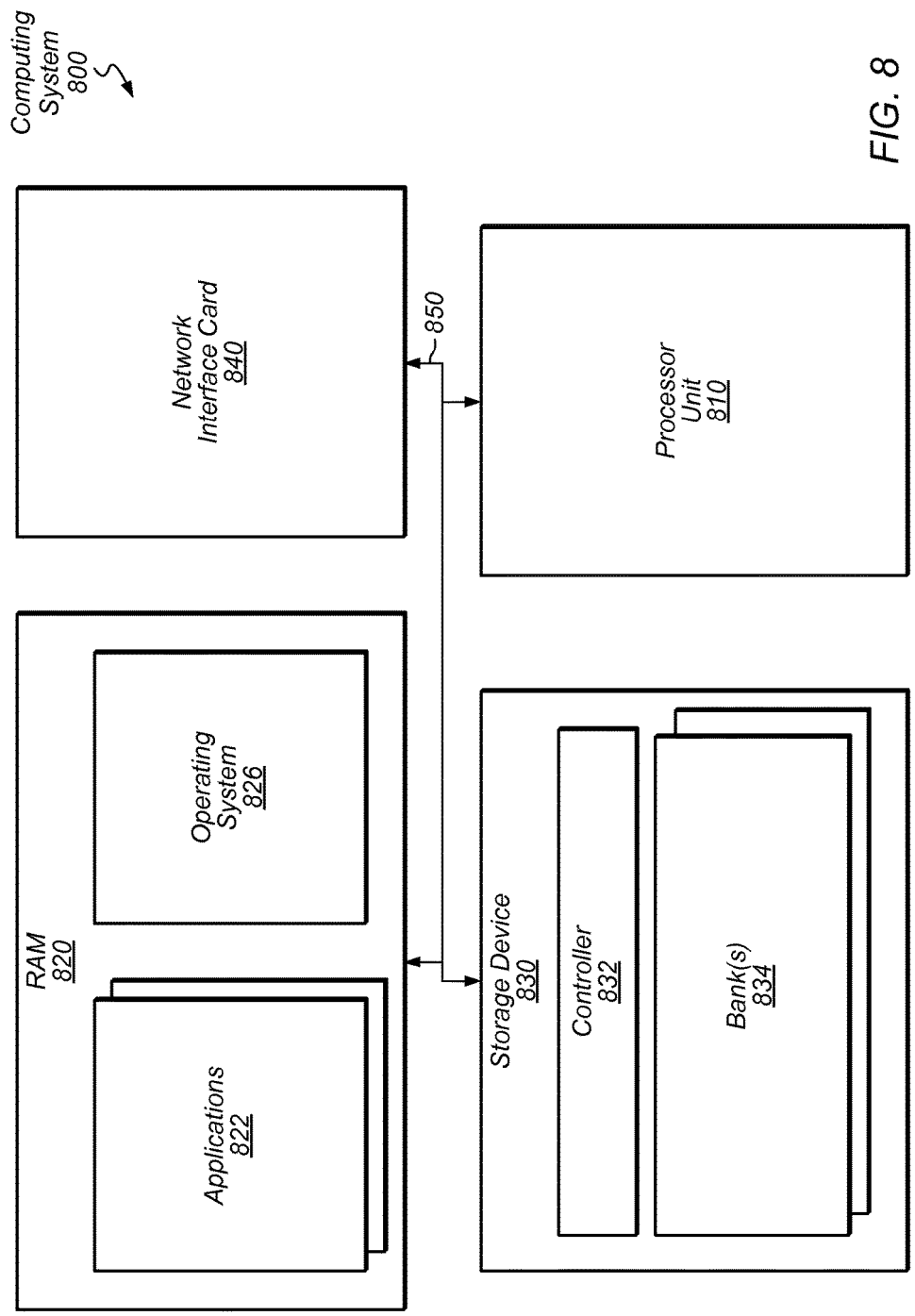
FIG. 8 is a block diagram illustrating one embodiment of an exemplary computing system that may be used to implement components of the storage system.

Turning now to FIG. 8, a block diagram of an exemplary computing system 800 is depicted. Computing system 800 is one embodiment of a computing system that may implement components of storage system 10 such as one or more storage processor nodes 110 and/or clients 150. Computing system 800 may be any suitable type of computing device such as a server, laptop, desktop, mobile device, etc. In the illustrated embodiment, computing system 800 includes a processor unit 810, random access memory (RAM) 820, storage device 830, and network interface card (NIC) 840 coupled together via an interconnect 850. As shown, RAM 820 may include program instructions for one or more applications 822 and an operating system 826.

Storage device 830 is representative of any physical medium upon which data can be recorded and may correspond to storage devices 120 discussed above. In some embodiments, storage devices 830 may be implemented such that it includes non-volatile memory such as hard disk drives (e.g., Integrated Drive Electronics (IDE) drives, Small Computer System Interface (SCSI) drives, Serial Attached SCSI (SAS) drives, Serial AT Attachment (SATA) drives, etc.), tape drives, writable optical drives (e.g., CD drives, DVD drives, Blu-Ray drives, etc.) etc. In some embodiments, storage devices 830 may be implemented such that it includes non-volatile solid-state memory. Accordingly, in such an embodiment, storage banks 834 may include any suitable type of solid-state storage media including, but not limited to, NAND flash memory, NOR flash memory, nano RAM (NRAM), magneto-resistive RAM (MRAM), phase change RAM (PRAM), Racetrack memory, Memristor memory, nanocrystal wire-based memory, silicon-oxide based sub-10 nanometer process memory, graphene memory, Silicon-Oxide-Nitride-Oxide-Silicon (SONOS), Resistive random-access memory (RRAM), programmable metallization cell (PMC), conductive-bridging RAM (CBRAM), etc. In some embodiments, storage device 830 may be implemented such that it includes volatile memory such as RAM, dynamic RAM (DRAM), static RAM (SRAM), synchronous dynamic RAM (SDRAM), etc.

Controller 832, in one embodiment, is configured to manage operation of storage device 830. Accordingly, controller 832 may facilitate performance of read operations at specified addresses including selecting the appropriate banks 834 and accessing the data within the appropriate cells within those banks. Controller 832 may support any suitable interconnect type such as a peripheral component interconnect (PCI), PCI express (PCI-e), serial advanced technology attachment (serial ATA or SATA), parallel ATA (PATA), small computer system interface (SCSI), IEEE 1394 (FireWire), Fiber Channel, universal serial bus (USB), etc. In various embodiments, controller 832 may be used to perform a replication process, for example, writing the contents of another storage device to storage device 830. In some embodiments, controller 832 may include a processor and memory having program instructions stored therein that are executable by the processor to cause performance of various operations described herein.

Applications 822, in one embodiment, include program instructions that are executable by processor unit 810. In some embodiments, applications 822 may include cluster resource manager 130, lock manager 140, storage driver 210, etc.

Network interface card 840, in one embodiment, is configured to enable computing system 800 to communicate with other computing systems via computer network. Network interface card 840 may support any suitable network protocol including wired protocols (such as Ethernet, Fibre Channel, etc.) and/or wireless protocols (Bluetooth®, WiFi®, WiMax®, Long Term Evolution (LTE), etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
 receiving, by a first processor at a first cluster node of a cluster, a first request to update state information for a logical volume of the cluster;
 acquiring, by the first processor, a master lock, a join lock, and a data lock from a lock manager of the cluster, wherein:
  the master lock controls modification of the state information to protect the state information by setting the join lock and the data lock and preventing other processors from acquiring the data lock and updating the state information while the first processor is updating the state information,
  the data lock conveys the state information to the first processor, and the join lock indicates whether the state information includes invalid data and facilitates correcting any data in the state information determined to be invalid; and in response to acquiring the data lock and determining that the state information does not include invalid data:
determining, by the first processor, each cluster node of the cluster that implements the logical volume,
updating, by the first processor, the state information across a subset of cluster nodes of the cluster that implement the logical volume, and
facilitating, by the first processor, release of the master lock, the join lock, and the data lock in response to updating the state information.

2. The method of claim 1, wherein the first cluster node updates the state information across only cluster nodes associated with the logical volume.

3. The method of claim 1, further comprising:
while the first cluster node is receiving the request to update the state information, beginning to receive, by a second processor at a second cluster node of the cluster that implements the logical volume, a second request to update the state information,
wherein the first and second cluster nodes service the first and second requests serially.

4. The method of claim 1, wherein the updating comprises:
the first processor modifying the state information; and
the first processor acquiring, from the lock manager, the join lock for a second cluster node to cause the second cluster node to retrieve the modified state information.

5. The method of claim 4, wherein the updating comprises:
the first processor acquiring a data lock associated with a lock value block; and
the first processor placing the modified state information into the lock value block,
wherein the second cluster node retrieves the modified state information from the lock value block.

6. The method of claim 4, wherein:
acquiring the lock for the second cluster node causes a callback routine to be invoked at the second cluster node; and
performance of the callback routine includes the second processor retrieving the modified state information.

7. The method of claim 1, wherein:
the first request is a request from a client device to reserve exclusive access to the logical volume; and
the updating includes updating the state information to include an indication of the reserved exclusive access.

8. An apparatus, comprising:
means for maintaining a master lock, a set of join locks, and a set of data locks for controlling access to configuration information usable by a plurality of servers to implement a storage system to protect the configuration information;
means for receiving, at a first of the plurality of servers, a request to access a set of storage devices of the storage system;
means for securing, for the first server, the master lock to facilitate modifying the configuration information by:
setting a join lock and a data lock,
preventing other servers from acquiring the data lock, and
updating the state information while the first server is updating the configuration information in response to the request;

means for securing, for the first server, a subset of the set of join locks to notify some, but not all, of the plurality of servers that the configuration information has been modified, the subset of the set of join locks indicating whether the configuration information includes invalid data and facilitating correcting any data in the configuration information determined to be invalid;
means for securing, for the first server, a subset of the set of data locks corresponding to the subset of join locks to copy the modified configuration information to the notified servers and convey the configuration information to the first server; and
means for releasing the master lock, the subset of join locks, and the subset of data locks in response to the modified configuration information being copied to the notified servers.

9. The apparatus of claim 8, further comprising:
means for a identifying ones of the plurality of servers as cluster nodes of the storage system; and
means for assigning the set of join locks and the set of data locks to the identified servers.

10. The apparatus of claim 9, further comprising:
means for associating the set of join locks and the set of data locks with a logical disk such that each join lock and each data lock controls access to configuration information for the logical disk; and
means for securing, for the first server, a respective join lock assigned to each of the plurality of servers associated with the logical disk to notify each server that the configuration information has been modified.

11. The apparatus of claim 9, further comprising:
means for assigning a join lock and a data lock to a second server of the plurality of servers;
means for securing the join lock to notify the second server that the configuration information is being modified; and
means for securing the data lock to copy the modification of the configuration information to the second server.

12. The apparatus of claim 8, further comprising:
means for detecting, at the first server, invalid information in the configuration information; and
means for securing, for the first server, a data lock associated with a second server of the plurality of servers to request that the second server replace the invalid information with correct configuration information.

13. The apparatus of claim 12, further comprising:
means for detecting the invalid information when the first server joins the storage system; and
means for notifying the lock management module that the first server has joined the storage system.

14. The apparatus of claim 8, further comprising:
means for securing at least one of the join locks to invoke a callback routine on a second server of the plurality of servers that retrieves the modified configuration information for the second server.

15. The apparatus of claim 8, further comprising:
means for maintaining a lock value block from one or more of the data locks;
means for providing the lock value block to the first server in response to the one or more data locks being secured for the first server; and
means for storing the modified configuration information in the lock value block to convey the configuration information to a second server of the plurality of servers.

16. A non-transitory computer readable medium including program instructions stored thereon, wherein the program instructions are executable by a computing system to cause the computing system to perform operations comprising:
- receiving, by a processor, a request to alter small computer system interface (SCSI) state information distributed across a plurality of storage servers, wherein the SCSI state information is usable by the plurality of storage servers to control access to a logical unit number (LUN);
- in response to the request, converting, by the processor, a master lock that restricts altering the SCSI state information by the plurality of servers to protect the SCSI state information while the processor is updating the SCSI state information;
- altering, by the processor, the SCSI state information based on the request;
- converting, by the processor, a subset of a set of join locks associated with a subset of the plurality of servers to notify the subset of servers that the SCSI state information has been altered, the subset of join locks indicating whether the SCSI state information includes invalid data and facilitating correcting any data in the SCSI state information determined to be invalid;
- propagating, by the processor via a subset of a set of data locks corresponding to the subset of join locks, the altered SCSI state information to the notified subset of servers; and
- conveying, via the subset of a set of data locks, the SCSI state information to the processor.

17. The computer readable medium of claim 16, wherein the propagating is to ones of the plurality of servers that serve the LUN without propagating the SCSI state information to ones of the plurality of servers that do not serve the LUN.

18. The computer readable medium of claim 16, wherein the propagating includes converting the join locks assigned to the notified subset of servers to invoke a callback routine that retrieves reservation information for the notified subset of servers.

19. The computer readable medium of claim 16, wherein:
- the computing system comprises a cluster of computing nodes;
- the cluster of computing nodes comprises one or more storage devices; and
- the program instructions are executable to implement a driver for the one or more storage devices of the cluster of computing nodes.

20. The computer readable medium of claim 16, wherein:
- each server in the notified subset of servers implements the LUN;
- each server in the set of servers not included in the notified subset of servers does not implement the LUN; and
- the propagating the altered SCSI state information to the notified subset of servers comprises copying the altered SCSI state information to the notified subset of servers.

* * * * *